(No Model.)
A. WURTS.
LIGHTNING ARRESTER.
No. 434,167. Patented Aug. 12, 1890.
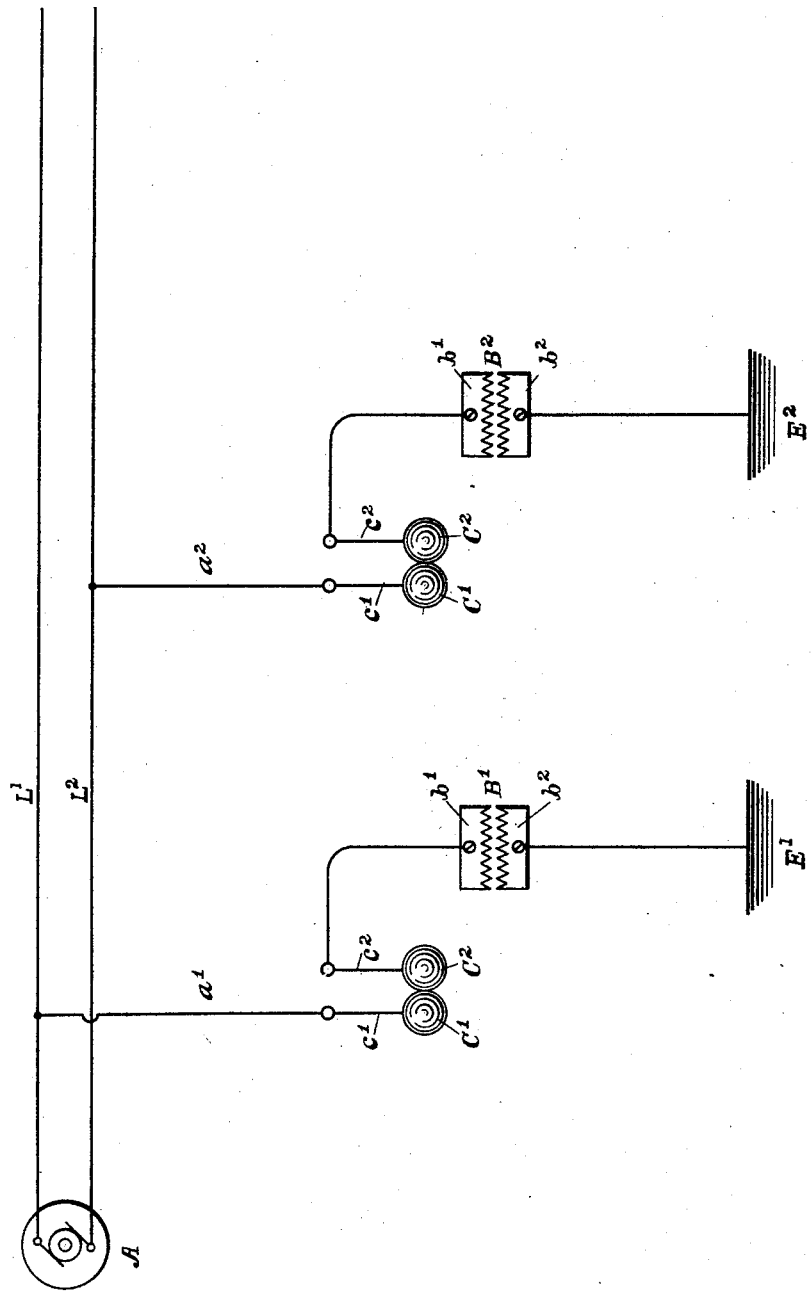
Witnesses
J. W. Smith
H. F. Allright Jr.
Inventor
Alexander Wurts
By his Attorney
Charles A. Terry

UNITED STATES PATENT OFFICE.

ALEXANDER WURTS, OF PITTSBURG, PENNSYLVANIA, ASSIGNOR TO THE WESTINGHOUSE ELECTRIC COMPANY, OF SAME PLACE.

LIGHTNING-ARRESTER.

SPECIFICATION forming part of Letters Patent No. 434,167, dated August 12, 1890.

Application filed January 16, 1890. Serial No. 337,104. (No model.)

*To all whom it may concern:*

Be it known that I, ALEXANDER WURTS, a citizen of the United States, residing in Pittsburg, county of Allegheny, and State of Pennsylvania, have invented a certain new and useful Improvement in Lightning-Arresters, (Case No. 386,) of which the following is a specification.

The invention relates to the class of devices employed for interrupting the connections of electric circuits—such, for instance, as are employed for protecting electrical apparatus and their operating circuits from injury resulting from lightning-discharges.

It is customary to connect the main-line conductors of a system of electrical distribution with the earth through some form of lightning-arrester which will allow the high-potential lightning discharges to reach the earth. It frequently happens, however, that the current from the dynamo-electric generator will flow through this circuit after the cessation of the lightning-discharge. The purpose of the present invention is to interrupt such a circuit in such manner as to prevent the continued flow of the current from the generator.

The invention consists in interposing in the circuit to be interrupted two electrodes, one movable with reference to the other and adapted to be thrown away the one from the other, or separated by the repulsive effects of the current passing from one to the other. A convenient plan is to support two movable electrodes of carbon—for instance, upon movable supports—and connect them in series with a pair of lightning-discharge plates of well-known construction. The lightning-discharge will take place through this circuit and across the space intervening between the plates, but a continued flow of the current from the generator causes the two electrodes to fly apart violently, thus interrupting the circuit and destroying the arc at the discharge-plates. The electrodes immediately return to their former position and the apparatus is in readiness for repeated operations.

In the accompanying drawing there is shown, in diagram, apparatus for carrying out the invention.

Referring to the drawing, A represents a dynamo-electric generator or source of electric currents, and $L'$ $L^2$ main-line conductors. A lightning-discharge circuit $a'$ is derived from the conductor $L'$, and its connections are with the earth at $E'$. A lightning-discharge device B, consisting of two serrated plates $b'$ $b^2$ of well-known construction, is inserted in the conductor $a'$ between the line $L'$ and the earth at $E'$. The lightning-discharge takes place across the space intervening between the plates. Two electrodes $C'$ and $C^2$ are also interposed in the conductor $a'$, and these may conveniently be of carbon blocks of suitable size and form. The spherical form has the advantage of presenting equivalent surfaces at all times. These are respectively supported upon movable rods or cords $c'$ $c^2$, free to move, the electrical connections being formed through the supports. If, now, lightning strikes the line $L'$, it finds a path through the conductor $a'$ and the electrodes $c'$ $c^2$ and across the space intervening between the plates $b'$ $b^2$. An arc having been established between the last-named plates the current from the generator A is liable to flow through the path thus formed. This, however, is prevented by the repulsion which is found to exist between the electrodes $c'$ $c^2$, causing them immediately to fly apart and thus completely interrupt the circuit-connections. In connection with the line $L^2$ a similar apparatus is shown as connected in the line $a^2$, which leads to the earth at $E^2$. The operation is similar to that already described.

The invention is not restricted to use in connection with lightning-arresters, but is useful for various other purposes.

I claim as my invention—

1. In a lightning-arrester for electric circuits, the combination of lightning-discharge plates and two electrodes in series therewith in the earth-circuit, resting normally in contact but separable on the passage of a discharge through the same and returnable thereafter to normal position, whereby the arc formed by said discharge is broken and the circuit restored, substantially as described.

2. A circuit-interrupter for lightning-arresters, consisting of two blocks of carbon normally in contact but movably suspended so as to separate on the passage of a discharge through the same and come together again after such passage, substantially as and for the purpose described.

3. A device for protecting electric circuits from the continuous flow of abnormal currents, consisting of discharge-plates in a grounded circuit and two electrodes, as $C'\ C^2$, normally in contact but separable for a short interval of time by the action of a high-tension discharge passing through them, substantially as described.

In testimony whereof I have hereunto subscribed my name this 10th day of January, A. D. 1890.

ALEXANDER WURTS.

Witnesses:
FRANCIS PETTIT MANN,
JAMES WILLIAM SMITH.